US008315997B1

(12) United States Patent
Peled et al.

(10) Patent No.: US 8,315,997 B1
(45) Date of Patent: Nov. 20, 2012

(54) AUTOMATIC IDENTIFICATION OF DOCUMENT VERSIONS

(75) Inventors: Ariel Peled, Raanana (IL); Elad Reznikov, Tel Aviv (IL); Shai Brumer, Nahariya (IL); Yizhar Regev, Ramat Gan (IL)

(73) Assignee: Nogacom Ltd., Herzliya (IL)

( * ) Notice: Subject to any disclaimer, the term of this patent is extended or adjusted under 35 U.S.C. 154(b) by 469 days.

(21) Appl. No.: 12/200,089

(22) Filed: Aug. 28, 2008

Related U.S. Application Data

(60) Provisional application No. 60/968,329, filed on Aug. 28, 2007.

(51) Int. Cl.
*G06F 7/00* (2006.01)
*G06F 17/30* (2006.01)

(52) U.S. Cl. ........................................ 707/695; 715/229

(58) Field of Classification Search ........................ None
See application file for complete search history.

(56) References Cited

U.S. PATENT DOCUMENTS

| | | | | |
|---|---|---|---|---|
| 5,331,554 A * | 7/1994 | Graham | ................................. | 1/1 |
| 5,423,032 A * | 6/1995 | Byrd et al. | ........................ | 704/1 |
| 5,463,773 A * | 10/1995 | Sakakibara et al. | .................. | 1/1 |
| 5,627,979 A * | 5/1997 | Chang et al. | .................. | 715/763 |
| 5,819,261 A * | 10/1998 | Takahashi et al. | ..................... | 1/1 |
| 5,920,854 A * | 7/1999 | Kirsch et al. | ........................... | 1/1 |
| 5,943,669 A | 8/1999 | Numata | | |
| 5,983,216 A * | 11/1999 | Kirsch et al. | ........................... | 1/1 |
| 6,205,456 B1 * | 3/2001 | Nakao | ........................... | 715/201 |
| 6,295,529 B1 * | 9/2001 | Corston-Oliver et al. | .... | 707/715 |
| 6,523,025 B1 * | 2/2003 | Hashimoto et al. | .................... | 1/1 |
| 6,556,987 B1 * | 4/2003 | Brown et al. | ........................ | 1/1 |
| 6,571,240 B1 * | 5/2003 | Ho et al. | .............................. | 1/1 |
| 6,687,689 B1 * | 2/2004 | Fung et al. | ............................ | 1/1 |
| 6,850,937 B1 * | 2/2005 | Hisamitsu et al. | ............ | 707/750 |
| 7,185,008 B2 | 2/2007 | Kawatani | | |
| 7,398,201 B2 | 7/2008 | Marchisio et al. | | |
| 2003/0033333 A1 * | 2/2003 | Nishino et al. | ................ | 707/531 |
| 2003/0101164 A1 * | 5/2003 | Pic et al. | ........................... | 707/1 |
| 2003/0187834 A1 * | 10/2003 | Oda et al. | .......................... | 707/3 |
| 2004/0006736 A1 * | 1/2004 | Kawatani | ...................... | 715/500 |
| 2004/0122826 A1 | 6/2004 | Mackie | | |
| 2004/0139397 A1 * | 7/2004 | Yuan et al. | ..................... | 715/517 |
| 2004/0181755 A1 * | 9/2004 | Murata et al. | ................. | 715/526 |
| 2005/0044426 A1 | 2/2005 | Vogel et al. | | |
| 2005/0060643 A1 * | 3/2005 | Glass et al. | ................ | 715/501.1 |
| 2005/0125216 A1 | 6/2005 | Chitrapura et al. | | |

(Continued)

OTHER PUBLICATIONS

Keyword extraction from a single document using word co-occurence statistical information, Yutaka et al , Flairs 2003.*

(Continued)

*Primary Examiner* — Pierre Vital
*Assistant Examiner* — Augustine K Obisesan
(74) *Attorney, Agent, or Firm* — D. Kligler IP Services Ltd.

(57) ABSTRACT

A computer-implemented method for document management includes extracting from an input document a set of terms, each term including a fixed number of words. Respective numbers of the terms that occur in each of a group of stored documents are counted, and a respective association rate is computed between the input document and each of at least some of the stored documents responsively to the respective numbers of the terms that were counted in the stored documents. One or more of the stored documents are identified as versions of the input document responsively to the association rate, and an identification of the stored documents that are versions of the input document is outputted.

6 Claims, 3 Drawing Sheets

U.S. PATENT DOCUMENTS

| | | | |
|---|---|---|---|
| 2005/0165600 A1* | 7/2005 | Kasravi et al. | 704/9 |
| 2006/0089924 A1* | 4/2006 | Raskutti et al. | 707/1 |
| 2006/0212441 A1* | 9/2006 | Tang et al. | 707/5 |
| 2007/0067289 A1* | 3/2007 | Novak | 707/6 |
| 2007/0294610 A1* | 12/2007 | Ching | 715/500 |
| 2008/0104016 A1* | 5/2008 | Atmaja | 707/2 |
| 2008/0109425 A1* | 5/2008 | Yih et al. | 707/5 |
| 2008/0162455 A1* | 7/2008 | Daga et al. | 707/5 |
| 2008/0250007 A1* | 10/2008 | Masuyama et al. | 707/5 |
| 2009/0157592 A1 | 6/2009 | Dua | |

OTHER PUBLICATIONS

Method of identifying versioned and plagiarized documents, Hoad et al, Journal for America socienty for information science and technology, 54(3), pp. 203-215, 2003.*

Summarizing similarities and difference among related documents, Bloedern et al, Information retrieval 1, 35-67, 1999.*

A document management methodology based on similar contents, Meziane et al, Information sciences 158 (2004) 15-36.*

Automatic Text Structuring and Summarization, Salton et al., Information Processing and Management, 33(2), 193-207, 1997.*

Summarizing Text Documents: Sentence Selection and Evaluation Metrics, Goldstein eta I., SGIR, pp. 121-128, 1999.*

Zhao, et al., Hierarchical Clustering Algorithms for Document Datasets; Data Mining and Knowledge Discovery vol. 10(2005): 141-168.

Anquetil et al.; File Clustering Using Naming Conventions for Legacy Systems. Proceedings of the 1997 conference of the Centre for Advanced Studies on Collaborative research , 1997, Toronto, Ontario, Canada.

U.S. Appl. No. 12/199,043 Office Action dated Sep. 29, 2011.

U.S. Appl. No. 12/853,310 Official Action dated Jun. 4, 2012.

U.S. Appl. No. 12/199,043 Official Action dated Apr. 25, 2012.

* cited by examiner

AUTOMATIC IDENTIFICATION OF DOCUMENT VERSIONS

CROSS-REFERENCE TO RELATED APPLICATION

This application claims the benefit of U.S. Provisional Patent Application 60/968,329, filed Aug. 28, 2007, whose disclosure is incorporated herein by reference.

FIELD OF THE INVENTION

The present invention relates generally to information processing, and specifically to methods and systems for document management.

BACKGROUND OF THE INVENTION

Most business and technical documents today are written, edited and stored electronically. Organizations commonly deal with vast numbers of documents, which often go through multiple versions. A document typically begins its life as a draft, which is updated and changed multiple times until a final, "official" version is created (which may be further changed subsequently). Identifying and using the proper version of the document is often crucial. Sending the wrong version of a document to an outside party, for example, can have serious negative consequences.

Keeping track of document versions becomes even more difficult when documents are shared among different members of an organization. This sort of situation is common, particularly since many documents are produced by collaborative effort of a number of people. As a result, there may be as many as hundreds of copies of a given document in different directories and accounts. These copies may be distributed, for example, among organizational file systems, document management systems and mail servers. Some of these copies may be identical (or nearly identical), while others may contain substantial changes or may only partially overlap. Different versions of the same document may be saved in different file formats and under different file names. Furthermore, documents are frequently reused, with one document serving as a template or starting point for other, similar documents.

Many document management systems and word processors include version tracking utilities or features. Most such utilities are useful, however, only when the all the versions are created and maintained using the same document management system or word processor, with explicit links among the versions.

SUMMARY OF THE INVENTION

Embodiments of the present invention that are described hereinbelow provide systems and methods for identifying and tracking document versions. These systems and methods may be applied to documents that are distributed among different file systems and servers, including different documents that have been created and stored in multiple different formats.

There is therefore provided, in accordance with an embodiment of the present invention, a computer-implemented method for document management. The method includes extracting from an input document a set of terms, each term including a fixed number of words. Respective numbers of the terms that occur in each of a group of stored documents are counted, and a respective association rate is computed between the input document and each of at least some of the stored documents responsively to the respective numbers of the terms that were counted in the stored documents. One or more of the stored documents are identified as versions of the input document responsively to the association rate, and an identification of the stored documents that are versions of the input document is outputted.

There is also provided, in accordance with an embodiment of the present invention, a computer-implemented method for document management, which includes receiving an input document containing an input spreadsheet. A respective measure of similarity is computed between the input spreadsheet and each of a plurality of stored spreadsheets contained in a group of stored documents. One or more of the stored spreadsheets are identified as versions of the input spreadsheet responsively to the measure of the similarity. An identification of the stored documents that are versions of the input document is outputted responsively to having identified the one or more of the stored spreadsheets as versions of the input spreadsheet.

Other embodiments provide apparatus and computer software products that operate according to the principles of the above methods.

The present invention will be more fully understood from the following detailed description of the embodiments thereof, taken together with the drawings in which:

DETAILED DESCRIPTION OF EMBODIMENTS

Overview

Figure 1:
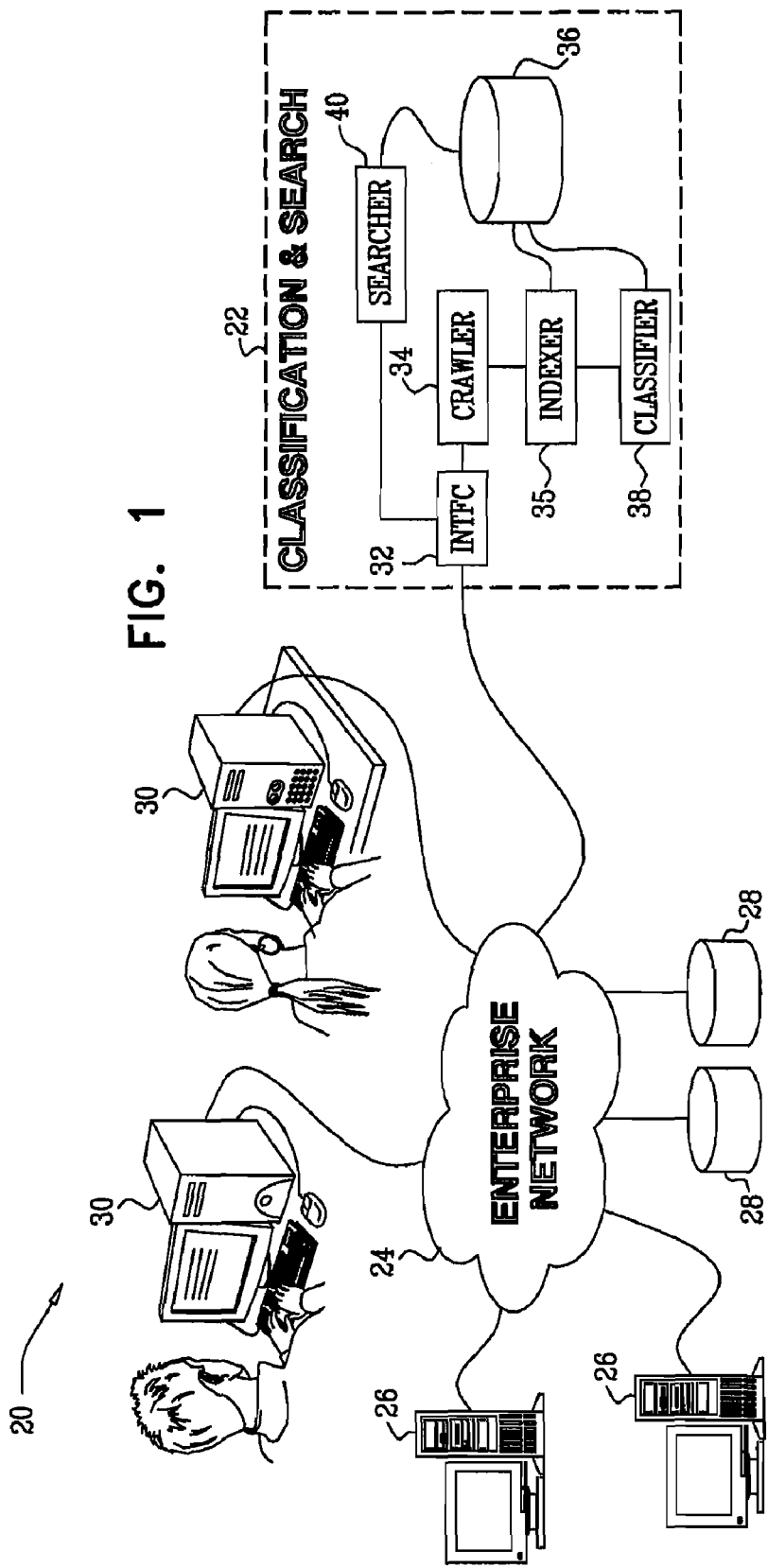
FIG. 1 is a block diagram that schematically illustrates a system for document management, in accordance with an embodiment of the present invention.

Embodiments of the present invention that are described hereinbelow provide methods and systems for tracking and managing document versions. The methods are generic and automatic and operate across different storage platforms and document formats. They are capable of comparing thousands of documents, without prior version classification or restriction, and identifying the documents that are related as versions of one another. For this purpose, the documents are retrieved from various repositories, indexed in a common format, and then compared efficiently using the index. The comparison is based only the textual content of the documents and is independent of their original format, structure and even language.

The relation between documents is expressed in terms of an association rate, which is a quantitative measure of the similarity between documents and thus indicates the likelihood that one document is a version of the other: The higher the association rate between two documents, the more likely they are versions of one another. The term "versions" is used in the context of the present patent application and in the claims to refer to documents that have a high degree of similarity to one another, without restriction as to which document was earlier or how the similarity came about. Although the embodiments described below provide a certain method and formulas for computing the association rate, other measures of similarity may alternatively be computed and used for the same purposes and are considered to be within the scope of the present invention.

In disclosed embodiments of the present invention, when the document version management system receives an input document, it calculates the association rate between this document and all documents already stored in the system. For each new input document, the indexing and comparison with stored documents may be accomplished in a single pass through the new document. Typically, the comparison extends over all parts of the new and stored documents, but a randomly-selected sample of the terms may be used in the comparison, rather than comparing all the terms. The results of this process may be stored as a version index in a database or other repository, so as to enable a user to retrieve and review all documents that are likely to be versions of a given base document. To reduce storage requirements, only version relations with association rates greater than a certain threshold may be saved in the version index, while relations with lower rates are discarded.

In some embodiments, the document management system handles spreadsheets (in any suitable format, such as Microsoft® EXCEL®, OpenOffice.org Calc, or other formats that are known in the art) separately from text documents, taking into account the specific characteristics of spreadsheet structure and content. For example, the system may read out and process spreadsheet content along both the rows and the columns of the spreadsheet. Additionally or alternatively, the system may process and compare both data values and formulas in the cells of the spreadsheet. Typically, changes in the formulas are more significant than changes in data values and are given greater weight in determining association rates between different spreadsheets. Additionally or alternatively, the spreadsheets may be converted to textual form and thus compared to text documents.

System Description

FIG. 1 is a block diagram that schematically illustrates a system 20 for document version management, in accordance with an embodiment of the present invention. System 20 is typically maintained by an organization, such as a business, for purposes of exchanging, storing and recalling documents used by the organization. A version classification and search server identifies document versions and builds a listing, such as an index, for use in retrieving versions of a given document, as described in detail hereinbelow.

System 20 is typically built around an enterprise network 24, which may comprise any suitable type or types of data communication network, and may, for example, include both intranet and extranet segments. A variety of servers 26 may be connected to the network, including mail and other application servers, for instance. Storage repositories 28 are also connected to the network and may contain documents of different types and formats, which may be held in one or more file systems or in storage formats that are associated with mail severs or other document management systems. Server 22 may use appropriate Application Programming Interfaces (APIs) and file converters to access the documents and convert their contents to text form.

Server 22 connects to network 24 via a suitable network interface 32. The server typically comprises one or more general-purpose computer processors, which are programmed in software to carry out the functions that are described herein. This software may be downloaded to server 22 in electronic form, over a network, for example. Alternatively or additionally, the software may be provided on tangible storage media, such as optical, magnetic or electronic memory media. Although server 22 is shown in FIG. 1, for the sake of simplicity, as a single unit, in practice the functions of the server may be carried out by a number of different processors, such as a separate processor (or even a separate computer) for each of the functional blocks shown in the figure. Alternatively, some or all of the functional blocks may be implemented simply as different processes running on the same computer. Furthermore, the computer or computers that perform the functions of server 22 may perform other data processing and management functions, as well. All such alternative configurations are considered to be within the scope of the present invention.

The functions of server 22 are described in greater detail with reference to the figures that follow. Briefly, server 22 comprises a crawler 38, which collects documents from system 20. An indexer 35 builds an index of terms in each document, as well as an index of the documents themselves. A classifier 38 compares the documents in order to create a version index, which indicates the association rates between documents in system 20. Indexer 35 and classifier 38 store the indices in an internal repository 36, which typically comprises a suitable storage device or group of such devices. The term "index," as used in the context of the present patent application and in the claims, means any suitable sort of searchable listing. The indices that are described herein may be held in a database or any other suitable type of data structure or format.

A searcher 40 receives requests, from users of client computers 30 or from other applications, to search the documents in system 20 for versions of a given base document. In response to such requests, the search consults the version index and provides the requester with a listing of all other documents whose association rates with the base document are above a given threshold (which may be preset or chosen by the user). The user may then browse the content and metadata of the documents in the listing in order to find the desired version.

Figure 2:
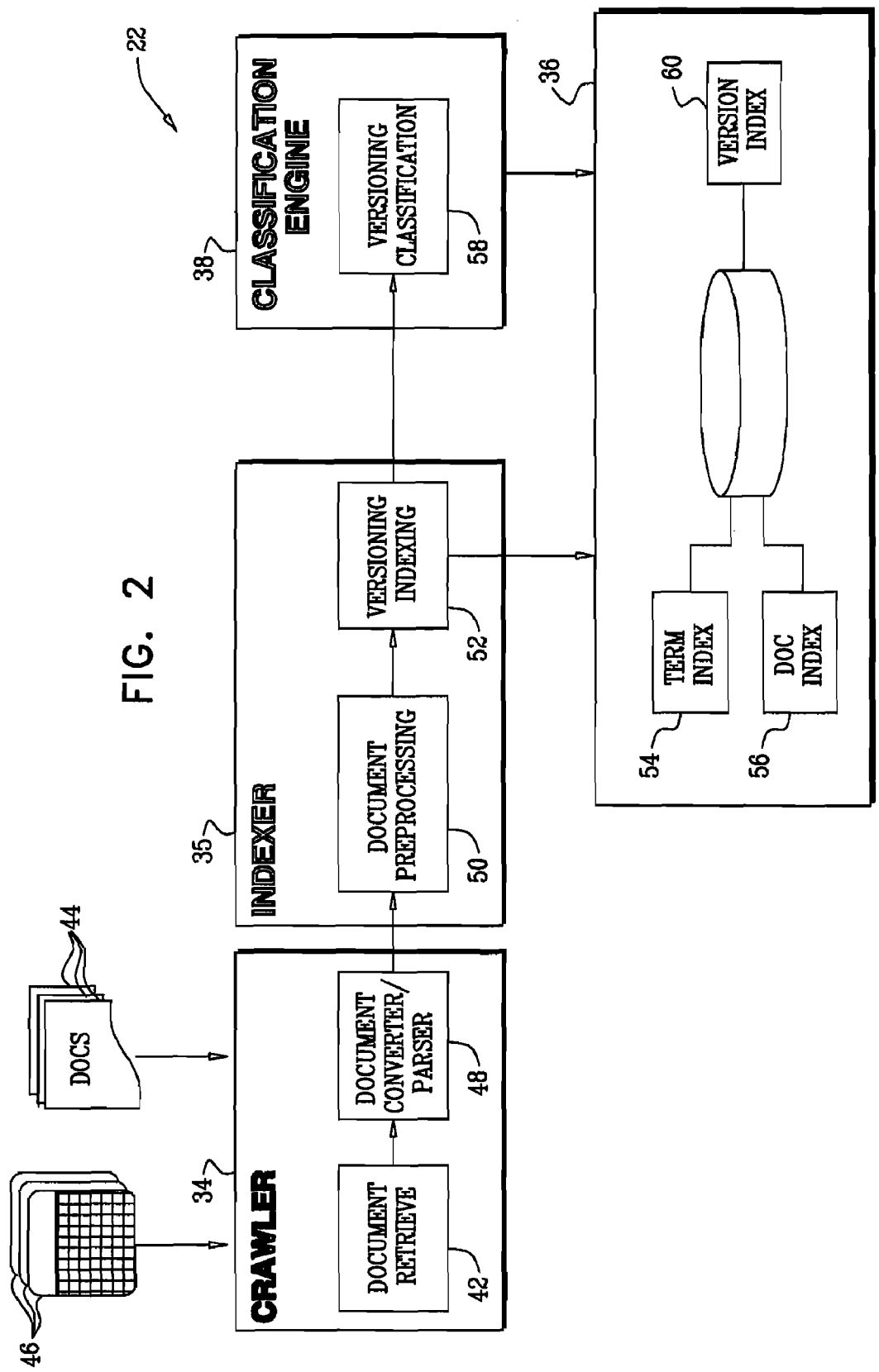
FIG. 2 is a block diagram that schematically shows details of a version classification and search server, in accordance with an embodiment of the present invention.

FIG. 2 is a block diagram that schematically shows functional details of server 22, in accordance with an embodiment of the present invention. Crawler 34 comprises a document retriever 42, which scans the file systems, document management systems and mail servers in system 20 and retrieves new documents, as well as documents that have recently been changed. The documents may include, for example, text documents 44 and spreadsheet documents 46, in various different formats, but server 22 is not limited to processing documents of these kinds. For example, crawler 34 may be configured to retrieve non-text documents, as well as spreadsheets that are embedded within other documents. The crawler may be capable of recognizing embedded files and separating them from the documents in which they are embedded.

A document converter/parser 48, which is functionally separate from the document retrieval operations of the crawler, converts each of these documents into standard text format. This conversion may include applying automated character recognition to document image formats, as well as extracting text from spreadsheets 46 in the manner described below with reference to FIG. 4.

Indexer 35 comprises a document preprocessor 50, which tokenizes each document into single words. The preprocessor may also remove "stop-words" (commonly-used auxiliary words, such as articles and pronouns), as well as punctuation marks. When system 20 includes documents in multiple different languages, the set of stop-words may be chosen by preprocessor 50 according to the language (or languages) of the document in question.

A versioning indexer 52 creates a term index 54 and a document index 56 in repository 36, and places appropriate entries for each new document in these indices. For this purpose, indexer 52 divides the document into terms of k consecutive words each, wherein k is a small fixed integer, typically between three and seven. Using k-token sequences, rather than single tokens, helps to ensure stability and reduce errors in comparing documents. Successive terms may overlap one another. (For example, when five-word terms are used, the first term may contain words 1-5, the next term words 2-6, and so forth.)

Indexer 52 creates a single record for each term in term index 54. The key to each record is the term itself or a suitable representation of the term. Each record contains a list of the document identifiers (document IDs) that represent the documents in which the term occurs. The list may be in a compressed form (such as a Zip file). The terms may be hashed using a suitable algorithm, such as MD5, to create respective numbers, which may then be used as keys for easy database access and random term sampling in document comparison, as explained below.

Document index 56 is a reverse index, which holds, for each document (according to its document ID), a list of the terms in the document. The term lists in index 56 may likewise be compressed. The reverse list in index 56 is required mainly for purposes of document update and delete operations: When a document is updated or deleted, the terms, in the document are found using document index 56, and the term records in term index 54 are updated accordingly For efficient document processing, indexer 52 may bulk-store the sets of document ID/document term list data in a database queue for further processing. The document term lists are then dequeued non-synchronically, and both of indices 54 and 56 are updated accordingly.

After the above tables have been updated, a versioning classifier 58 in classification engine 38 computes the association rates between pairs of documents, using term index 54. This process is shown in greater detail in FIG. 3, as described hereinbelow. Classifier 58 writes the association rates that are above a certain threshold—indicating that a versioning link exists between the documents in question—to a version index 60 in repository 36.

Version index 60 may subsequently be queried by searcher 40 (FIG. 1) according to the document ID of any chosen document (referred to herein as the "base document"). The query returns the document IDs of all documents that are "versions" of the base document, or possibly only the versions with an association rate above a certain threshold that is specified in the query. The searcher may present the results to the user via a client user interface of server 22. Alternatively or additionally, the version index may be accessed by another system or application using a suitable API.

Methods for Versioning Classification

Figure 3:
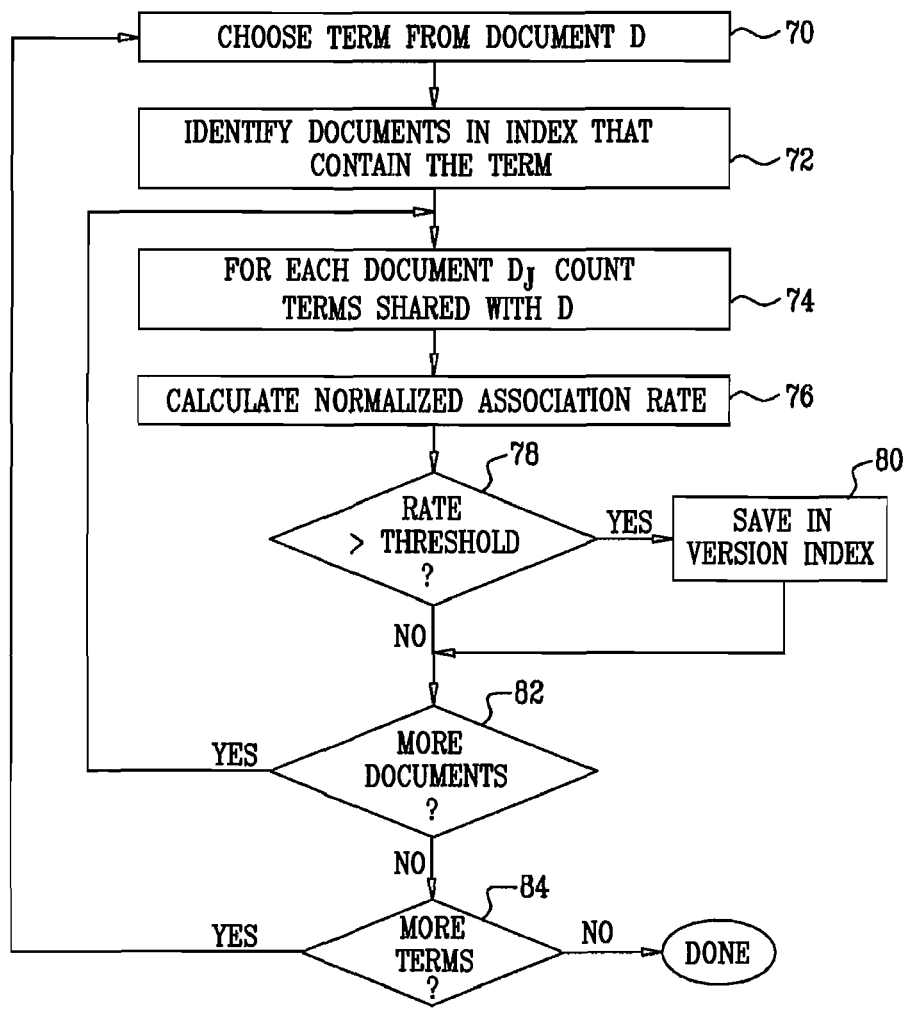
FIG. 3 is a flow chart that schematically illustrates a method for comparing text documents, in accordance with an embodiment of the present invention.
Figure 4:
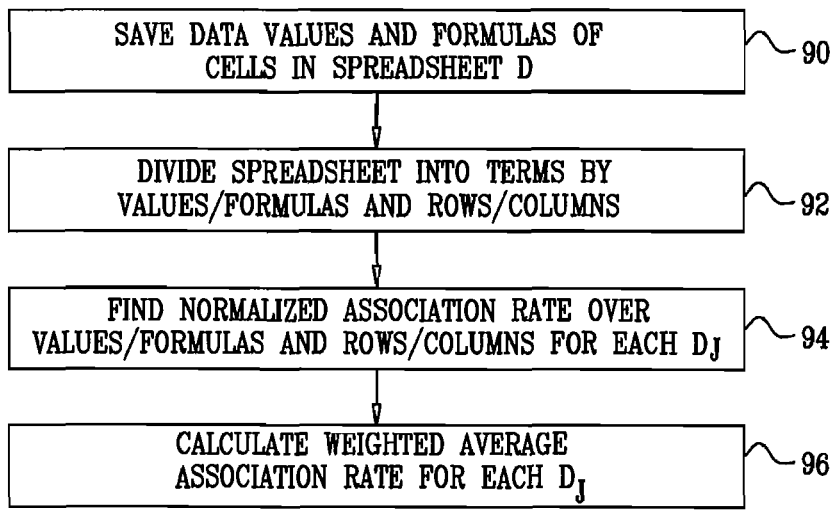
FIG. 4 is a flow chart that schematically illustrates a method for comparing spreadsheet documents, in accordance with an embodiment of the present invention.

FIG. 3 is a flow chart that schematically illustrates a method for comparing text documents, in accordance with an embodiment of the present invention. In the description that follows, it is assumed, for clarity of explanation, that the method is carried out by classification engine 38 in server 22, although the method is not necessarily tied to the particular architecture that is shown in FIGS. 1 and 2. This method uses term index 54, which may be generated in the manner described above. It is applicable to substantially any type of document in system 20. Spreadsheets, however, receive additional special treatment, as shown in FIG. 4.

Versioning classifier 58 receives a set of k-word terms $T_1, \ldots, T_N$, which were found by indexer 35 in the current input document D and were indexed as described above. The versioning classifier chooses one of these terms, at a term selection step 70. For each term, the versioning classifier retrieves from term index 54 the document IDs of all the stored documents $D_1, \ldots, D_M$ that contain this term, at a document identification step 72. For greater efficiency, steps 70 and 72 may be performed only on a random subset of all the terms in document D. The inventors have found, for example, that sampling 10% of the terms is usually sufficient.

For each document $D_J$ that was found to contain the term in question, versioning classifier 58 counts the number of terms that are shared by $D_J$ and D (i.e., terms that occur in both documents), at a term counting step 74. This count is denoted Count_Common(D,$D_J$). The versioning classifier uses this count, at a rate computation step 76, in calculating the normalized association rate:

$$A(D_J) = \text{Count\_Common}(D, D_J) / \text{Max}\{\text{Number of terms in } D, \text{Number of terms in } D_J\}.$$

The versioning classifier compares the associate rate value to a predetermined threshold (for example, 0.4), at a rate comparison step 78. If the value is above threshold, the versioning classifier saves a corresponding entry in versioning index 60, as described above, at an index recording step 80. (Alternatively, the association rate may be defined such that a low value is indicative of a high measure of similarity between documents.)

Versioning classifier 58 checks whether there are any remaining documents found at step 72 that have not yet been processed, at a document checking step 82. If so, the next such document is processed starting at step 74. Otherwise, the versioning classifier checks whether there are further terms in document D to be processed, at a term checking step 84. If so, the next such term is chosen at step 70. This procedure continues until all of terms $T_1, \ldots, T_N$ have been processed.

In the process described above, there is no need for server 22 to scan all of term index 54: It is sufficient to access only the records corresponding to the terms in document D (and the documents listed in these records). Therefore, the procedure shown in FIG. 3 may be carried out concurrently and in conjunction with creating the entries for document D in indices 54 and 56.

FIG. 4 is a flow chart that schematically illustrates a method for comparing spreadsheet documents, in accordance with an embodiment of the present invention. This method is applicable to substantially any spreadsheet format that is known in the art, as long as the spreadsheet provides, an API that permits its contents to be read out automatically by server 22. The method follows generally along the lines of FIG. 3, with certain modifications for working with spreadsheets that are described below. When a spreadsheet file includes multiple sheets, the method of FIG. 4 may treat each sheet as a separate document for purposes of indexing and document comparison.

Prior to document comparison, indexer 35 saves, for each cell in the current spreadsheet, both the formula and the data value of the cell, at a cell processing step 90. For example, a formula in an EXCEL spreadsheet may have the form +A2+A3. The data value is the result of the computation specified by the formula or is a fixed value stored in the spreadsheet, and may be either a number or a text string. The indexer will save the above formula as "+A2+A3", while the saved data value will be the actual numerical sum of the value in cell A2 and the value in cell A3. The indexer counts the total number of cells in the spreadsheet that contain formulas and the total number of cells containing fixed values.

Indexer 35 divides the spreadsheet into k-word terms, at a term extraction step 92. (In this context, a "word" may be either a formula or a data value.) This step is performed separately over the values and the formulas in the cells and over the rows and columns of the spreadsheet, thus generating sets of row terms and column terms. In other words, step 92 includes the following sub-steps:

1. Go over the spreadsheet rows and divide the sheet into k-word terms using the cell values (Row Value Terms—RVT).
2. Go over the spreadsheet columns and divide the sheet into k-word terms using the cell values (Column Value Terms—CVT).
3. Go over the spreadsheet rows and divide the sheet into k-word terms using the cell formulas (Row Formula Terms—RFT)
4. Go over the spreadsheet columns and divide the sheet into k-word terms using the cell formulas (Columns Formula Terms—CFT).

Alternatively, in the above sub-steps, the entire value or formula in each cell may be treated as one "token," in which case the extracted terms will be sequences of k cells. The indexer creates entries in term index 54 and document index 56 according to each of the four types of terms listed above.

Classification engine 38 carries out the method of FIG. 3 for the current spreadsheet document D with respect to each of the four types of terms in the document (RVT, CVT, RFT and CFT), at an association rate computation step 94. The classification engine thus computes separate values of the normalized association rate A for each type of terms in each document $D_J$ that is compared to D: A(RVT), A(CVT), A(RFT) and A(CFT).

The classification engine then combines these separate values to find an overall weighted average association rate for each compared document $D_J$, at an average computation step 96. For this purpose, the classification engine first finds weighted average association rates for the rows and the columns of the spreadsheet:

$$A(RFT)*w + A(RVT)*(1-w) = \text{Row Association Rate}$$

$$A(CFT)*w + A(CVT)*(1-w) = \text{Column Association Rate}$$

Here w is the relative weight of the formula-based association rates, while (1−w) is the relative weight of the value-based association rates. w has a value between 0 and 1, and is typically set in the range of (0.6, 0.8), giving the formula-based association rates a higher weight. Typically, formulas are more stable than data values over the "life cycle" of a spreadsheet and are thus a better indicator of a version relationship between different spreadsheets.

The overall association rate between a pair of spreadsheets is the maximum of their Row Association Rate and their Column Association Rate. For multi-sheet spreadsheet documents, an overall association rate may be set to the average of the maximum of the individual sheet association rates for each sheet (since a given sheet in one multi-sheet document can have several associations with sheets in another such document).

The overall spreadsheet association rates are used in identifying the stored spreadsheet documents that may be considered versions of the input spreadsheet document, in the manner described above. Additionally or alternatively, a spreadsheet may be compared to text documents by converting the spreadsheet to a sequence of text tokens.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for document management, the method comprising:
    receiving an input document containing an input spreadsheet;
    computing a respective measure of similarity between the input spreadsheet and each of a plurality of stored spreadsheets contained in a group of stored documents;
    identifying one or more of the stored spreadsheets as versions of the input spreadsheet responsively to the measure of the similarity; and
    outputting an identification of the stored documents that are versions of the input document responsively to having identified the one or more of the stored spreadsheets as versions of the input spreadsheet,
    wherein computing the respective measure of the similarity comprises extracting respective formulas from the cells of the input and stored spreadsheets and computing respective data values of the cells of the input and stored spreadsheets, and comparing both the formulas and the data values in order to compute the respective measure of the similarity,
    wherein comparing both the formulas and the data values comprises computing a first association rate with respect to the formulas and computing a second association rate with respect to the data values, and finding the measure of the similarity as a weighted sum of the first and second association rates.

2. The method according to claim 1, wherein the input and stored spreadsheets comprise rows and columns, and wherein computing the respective measure of the similarity comprises extracting from the input spreadsheet a first set of row terms from the rows of the input spreadsheet, and extracting from the input spreadsheet a second set of column terms from the columns of the input spreadsheet, and counting respective numbers of the row terms and the column terms that occur in the rows and columns of the stored spreadsheets.

3. Apparatus for document management, comprising:
    an interface, which is coupled to access documents in one or more data repositories; and
    a processor, which is configured to receive an input document containing an input spreadsheet, to compute a respective measure of similarity between the input spreadsheet and each of a plurality of stored spreadsheets contained in a group of stored documents, to identify one or more of the stored spreadsheets as versions of the input spreadsheet responsively to the measure of the similarity, and to output an identification of the stored documents that are versions of the input document responsively to having identified the one or more of the stored spreadsheets as versions of the input spreadsheet,
    wherein computing the respective measure of the similarity comprises extracting respective formulas from the cells of the input and stored spreadsheets and computing respective data values of the cells of the input and stored spreadsheets, and comparing both the formulas and the data values in order to compute the respective measure of the similarity, wherein comparing both the formulas and the data values comprises computing a first association rate with respect to the formulas and computing a second association rate with respect to the data values, and finding the measure of the similarity as a weighted sum of the first and second association rates.

4. The apparatus according to claim 3, wherein the processor is configured to extract respective formulas from the cells of the input and stored spreadsheets and computing respective data values of the cells of the input and stored spreadsheets, and comparing both the formulas and the data values in order to compute the respective measure of the similarity.

5. The apparatus according to claim 3, wherein the input and stored spreadsheets comprise rows and columns, and wherein the processor is configured to extract from the input spreadsheet a first set of row terms from the rows of the input spreadsheet, and to extract from the input spreadsheet a second set of column terms from the columns of the input spreadsheet, and to count respective numbers of the row terms and the column terms that occur in the rows and columns of the stored spreadsheets.

6. A computer software product, comprising a non-transitory computer-readable medium in which program instructions are stored, which instructions, when read by a computer, cause the computer to receive an input document containing an input spreadsheet, to compute a respective measure of similarity between the input spreadsheet and each of a plurality of stored spreadsheets contained in a group of stored documents, to identify one or more of the stored spreadsheets as versions of the input spreadsheet responsively to the measure of the similarity, and to output an identification of the stored documents that are versions of the input document responsively to having identified the one or more of the stored spreadsheets as versions of the input spreadsheet, wherein computing the respective measure of the similarity comprises extracting respective formulas from the cells of the input and stored spreadsheets and computing respective data values of the cells of the input and stored spreadsheets, and comparing both the formulas and the data values in order to compute the respective measure of the similarity, wherein comparing both the formulas and the data values comprises computing a first association rate with respect to the formulas and computing a second association rate with respect to the data values, and finding the measure of the similarity as a weighted sum of the first and second association rates.

* * * * *